(12) United States Patent
Kawan

(10) Patent No.: US 6,889,198 B2
(45) Date of Patent: *May 3, 2005

(54) METHOD AND SYSTEM FOR TRACKING SMART CARD LOYALTY POINTS

(75) Inventor: Joseph C. Kawan, Hollywood, CA (US)

(73) Assignee: Citicorp Development Center, Inc., Los Angeles, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 11 days.

(21) Appl. No.: 09/234,889

(22) Filed: Jan. 21, 1999

(65) Prior Publication Data

US 2002/0065712 A1 May 30, 2002

Related U.S. Application Data

(60) Provisional application No. 60/073,093, filed on Jan. 30, 1998.

(51) Int. Cl.$^7$ .......................... G06F 17/60; G06F 17/00
(52) U.S. Cl. ........................................................ 705/14
(58) Field of Search ............................. 705/14, 35, 41; 235/380, 379

(56) References Cited

U.S. PATENT DOCUMENTS

| | | | | |
|---|---|---|---|---|
| 5,721,781 A | * | 2/1998 | Deo et al. | 380/25 |
| 6,018,717 A | * | 1/2000 | Lee et al. | 705/13 |
| 6,024,288 A | * | 2/2000 | Gottlich et al. | 235/493 |
| 6,061,660 A | * | 5/2000 | Eggleston et al. | 705/14 |
| 6,085,976 A | * | 7/2000 | Sehr | 235/384 |
| 6,105,008 A | * | 8/2000 | Davis et al. | 705/41 |
| 6,129,274 A | * | 10/2000 | Suzuki | 705/16 X |

FOREIGN PATENT DOCUMENTS

| | | | | |
|---|---|---|---|---|
| DE | 296 19 000 U1 | 2/1997 | ........... | G06F/17/60 |
| EP | 253 240 B1 | 3/1992 | ........... | G07G/1/00 |
| EP | 0 644 513 A2 | 3/1995 | ........... | G07F/7/10 |
| EP | 0933717 A2 | * 8/1999 | | |
| EP | 786 746 B1 | 3/2000 | ........... | G07F/7/02 |
| FR | 2754082 A1 | * 4/1998 | | |
| GB | 2274349 A | * 7/1994 | | |
| JP | 02000011109 A | * 1/2000 | | |
| WO | WO 94/28498 | 12/1994 | ........... | G06F/15/30 |
| WO | WO-97/10560 | * 3/1997 | | |
| WO | WO-97/18653 | * 5/1997 | | |

OTHER PUBLICATIONS

Microsoft Press Computer Dictionary, Third Edition, 1997, pp. 308 and 439.*

(Continued)

Primary Examiner—James W. Myhre
(74) Attorney, Agent, or Firm—Kilpatrick Stockton LLP; George T. Marcou

(57) ABSTRACT

A method and system for tracking and redeeming smart card loyalty points includes storing loyalty program information related to transactions with at least one merchant in a loyalty register residing on a smart card microcomputer for the customer. Transaction information about transactions with the merchant is stored in a purchase log likewise residing on the smart card microcomputer for the customer. The stored transaction information is compared with the stored loyalty program information, and transaction information about one or more transactions with the merchant which is stored in the purchase log, but which is omitted from the loyalty register, is automatically identified. The stored loyalty program information is then automatically updated with the omitted transaction information. The transaction information includes, for example, a plurality of unique transaction numbers in ascending order, and identifying the omitted transaction information involves identifying one or more transaction numbers in the stored transaction information that is greater than any transaction number stored in the loyalty program information.

42 Claims, 10 Drawing Sheets

OTHER PUBLICATIONS

Carson, A.B. et al, "College Accounting", 1967, South-Western Publishing Company, pp 294–295.*

European Search Report on European Application No. EP 99 10 1600, dated Jan. 9, 2001 (mailing date).

Search Report and Written Opinion issued by the Austrian Patent Office for Singapore Application No. 9900214–9, dated Oct. 19, 2000 (mailing date).

Press Release from the MS Presswire via NewsEdge Corporation, dated May 19, 1998, entitled "Scheme for Dutch Chain Edah Improves Sales and Customer Knowledge".

Press Release from the MS Presswire via NewsEdge Corporation, dated May 19, 1998, entitled "EMV–Compatible Card Supports Targeted Loyalty, Plus E–Purse, Payment, E–Commerce".

* cited by examiner

PURCHASE LOG — 26
TRANSACTION INFORMATION

| UNIQUE TRANSACTION NUMBERS IN ASCENDING ORDER — 30 |
| MERCHANT ID NUMBER — 32 |
| DATE OF TRANSACTION — 34 |
| AMOUNT OF TRANSACTION — 36 |

FIG. 3

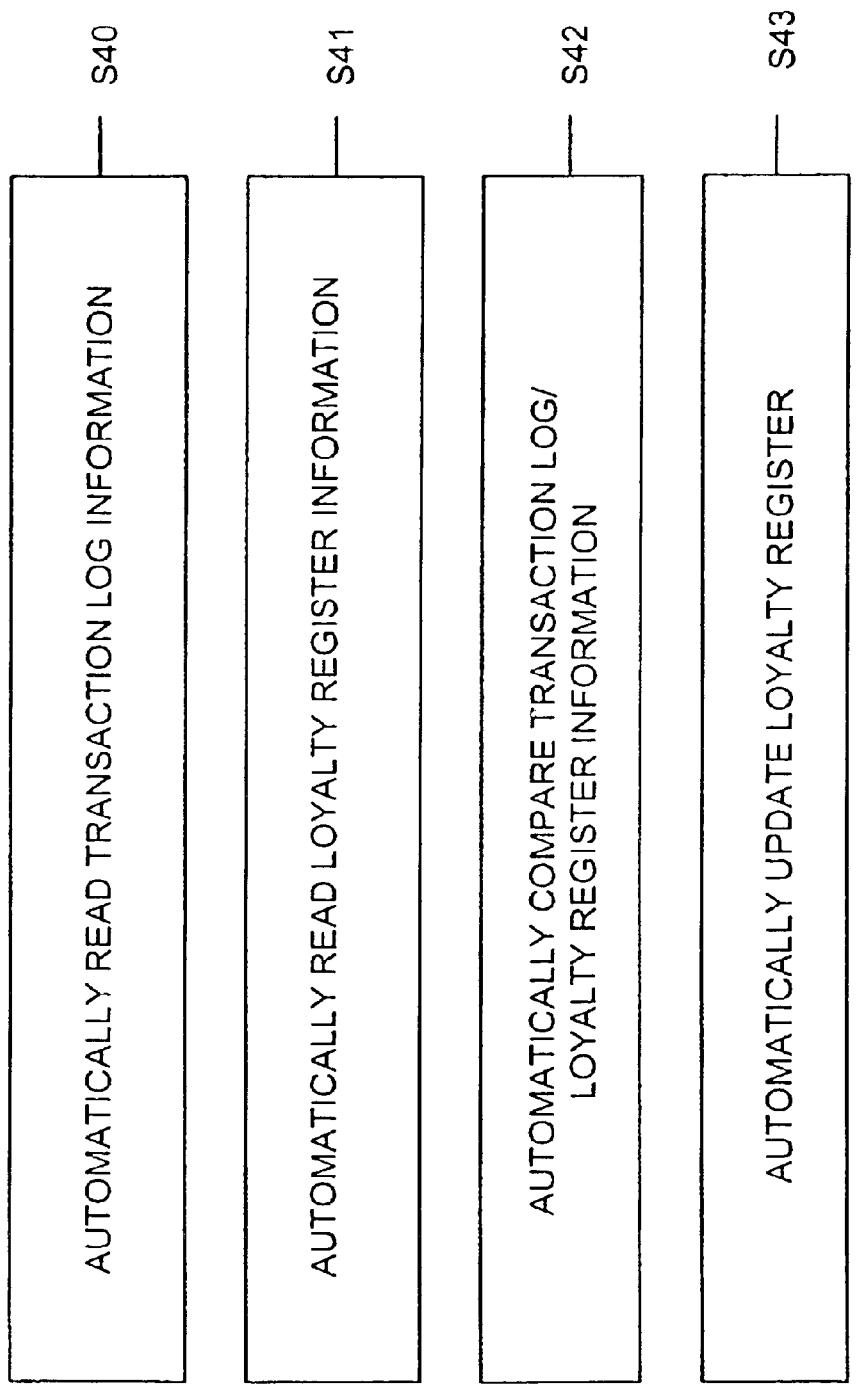

METHOD AND SYSTEM FOR TRACKING SMART CARD LOYALTY POINTS

CROSS-REFERENCE TO RELATED APPLICATIONS

The present application claims the benefit of U.S. Provisional Application No. 60/073,093 filed Jan. 30, 1998.

FIELD OF THE INVENTION

The present invention relates generally to the field of smart cards and, more particularly, to a method and system for tracking merchant loyalty points in a smart card loyalty program.

BACKGROUND OF THE INVENTION

A smart card is typically a plastic card about the size of a credit card that is embedded with a microcomputer that makes it "smart." The microcomputer stores information while protecting it from unauthorized access. A smart card that is imbedded with a microcomputer can process data on the card and can add, delete, and otherwise manipulate information on the card. Smart cards are used for a variety of applications, such as storing value, which a consumer can spend in a transaction with a merchant.

The utilization of smart cards for consumer transactions has resulted in a demand for loyalty programs associated with these transactions which award loyalty points to consumers. For example, a consumer using a smart card as a stored value card makes a purchase from a merchant using, for example, a merchant terminal. Loyalty points for the purchase may be put on the card at the merchant terminal by modifying the merchant terminal to accomplish this function. There also must be an intermediate system that collects the points and passes them forward to a host processor or central computer. A great deal of effort and expense is required to initiate such a system, because it interacts with and requires changes to the other terminal software.

Such additions and modifications to terminal software also require significant effort in testing and validation. As such, loyalty systems of this type require a significant investment in equipment, as well as time and centralized management, to oversee the entire process. Another disadvantage of running a loyalty program off a modified merchant terminal is reduction in throughput. Allocating and redeeming loyalty points at the modified merchant terminal increases transaction time, causes longer check-out lines, and creates a need for more personnel. Thus, there is a need for an off-line loyalty program, or a loyalty program which performs loyalty updates as an automatic function of the smart card itself at the merchant terminal, including tracking and redeeming of smart card loyalty points, that can be inexpensively integrated and controlled by local merchants.

SUMMARY OF THE INVENTION

It is an object and advantage of the present invention to provide a method and system for tracking and updating smart card loyalty points which allows the inexpensive implementation of a merchant loyalty program.

It is a further object and advantage of the present invention to enable merchants, such as those with limited markets or limited capital or in remote areas, who in the past found it prohibitively expensive to establish loyalty programs, to quickly and easily set up a merchant loyalty program.

It is another object and advantage of the present invention to create new market advantages for such merchants where none existed in the past and to permit, for example, a merchant selling groceries to join with a merchant selling gasoline, so that their loyalty points may be exchanged at each other's businesses.

It is an additional object and advantage of the present invention to provide a type of arrangement which entices customers to frequent the businesses of each of such merchants in order to determine the particular merchandise for which the loyalty points can be exchanged, rather than only rewarding current customers.

It is also an object and advantage of the present invention to provide an arrangement that garners new customers for each of such merchants and thus benefits each merchant.

To achieve the stated and other features, advantages and objects of the present invention, an embodiment of the present invention provides a method and system of tracking smart card loyalty program information in which loyalty program information related to transactions with at least one merchant is stored in a loyalty register of a smart card loyalty program application residing on a smart card microcomputer for the customer, for example, on a transaction log of the smart card microcomputer. Transaction information about transactions with the merchant is stored in a purchase log of the transaction log on the smart card microcomputer for the consumer. The transaction information stored on the purchase log of the smart card is compared with the loyalty program information on the loyalty register of the smart card, and transaction information about at least one transaction with the merchant which is stored on the purchase log, but for which corresponding loyalty program information related to the transaction is not stored on the loyalty register, i.e., which is omitted from the stored loyalty program information, is automatically identified. The stored loyalty program information is then automatically updated with the omitted transaction information, either automatically at the merchant terminal by an application program running on the smart card microcomputer or at a stand alone terminal.

In an embodiment of the present invention, the smart card loyalty program application is loaded for the customer into programmable memory on the smart card microcomputer at a terminal, such as the merchant terminal or the stand alone terminal, which includes a microcomputer. The smart card is inserted into the terminal, and the customer inputs customer information in response to a prompt from a smart card loyalty program load application on the terminal. The smart card loyalty program load application then loads the smart card loyalty program application onto the smart card microcomputer, for example, into programmable memory on the smart card microcomputer. The smart card loyalty program information that is stored for the customer on the loyalty register of the loyalty application includes, for example, a merchant identification number associated with the merchant.

In an embodiment of the present invention, the transaction information is stored for the customer when a merchant transaction is performed for the customer on a terminal, such as the merchant terminal. The smart card is inserted into the terminal, and information or data representing monetary value is transferred for the customer between a stored value application on the smart card microcomputer and a merchant application. The transferred information represents monetary value unloaded from or loaded to the stored value application on the smart card microcomputer. The transfer is automatically logged for the customer to the purchase log of the smart card, and the smart card is removed from the merchant terminal. The transaction information includes, for example, a transaction identifier associated with the merchant transaction for the customer, such as a unique transaction number, and also includes, for example, a merchant number associated with the merchant. The transaction information also includes the amount of the merchant transaction and the date of the merchant transaction.

In an embodiment of the present invention, the transaction information that is stored on the smart card microcomputer for the customer is stored in the purchase log of the transaction log on the smart card microcomputer during a merchant transaction, for example; at a merchant terminal. The merchant transaction involves transferring information representing monetary value between the stored value application on the smart card microcomputer and, for example, a merchant application on the merchant terminal for the customer. Information about the transaction is automatically logged to the purchase log on the smart card microcomputer for the customer. The transaction information includes, for example, the transaction identifier associated with the transaction, such as the unique transaction number, and the merchant identification number associated with the merchant. The transaction information also includes particulars of the transaction amount and the transaction date.

In an embodiment of the present invention, following a transaction, or as part of a transaction, with the smart card, for example, at the merchant terminal, the transaction information stored in the purchase log on the smart card microcomputer is automatically compared at a terminal, such as the merchant terminal by an application on the smart card microcomputer or at a stand alone terminal, with the loyalty program information stored in the loyalty register on the smart card microcomputer. If a transaction identifier for a merchant transaction appears in the omitted transaction information for which there is a corresponding merchant identifier stored in the loyalty program information, the omitted transaction information is automatically identified and the stored loyalty program information is automatically updated with the omitted information at the merchant terminal or at a stand alone terminal. A summary report of the updated loyalty program information for the merchant can be automatically printed on a printer associated with the terminal. The updated loyalty program information can also be automatically uploaded immediately from the smart card at the terminal to a back office loyalty program server or batched for later upload.

In an embodiment of the present invention, typically a plurality of unique transaction numbers are stored in the purchase log of the smart card microcomputer in ascending order, each associated with a particular merchant transaction. Likewise, the stored loyalty program information includes the unique transaction numbers associated with one or more of the participating merchant transactions. Therefore, automatically identifying omitted transaction information includes, for example, identifying one or more transaction numbers stored with the transaction information that is greater than any transaction number stored with the loyalty program information. Further, the stored loyalty program information also includes, for example, loyalty points associated with each merchant transaction, as well as a balance of accumulated loyalty points. The customer can access the accumulated loyalty point information stored on the smart card microcomputer at a terminal, such as the merchant terminal, stand alone terminal, or personal hand held reader device and display the balance information on a display screen associated with the terminal/reader device.

The customer can also access and display information about redeeming some or all of the accumulated loyalty points at the terminal. Further, the customer can enter a request for redemption of some or all of the accumulated points on an input device associated with the terminal. Likewise, a redemption coupon can be automatically printed for the customer on the printer associated with the terminal, and the terminal can automatically update the balance information with information about the redemption.

Additional objects, advantages and novel features of the invention will be set forth in part in the description which follows, and in part will become more apparent to those skilled in the art upon examination of the following or may be learned by practice of the invention.

BRIEF DESCRIPTION OF THE DRAWINGS

FIG. 3 is a table which illustrates the key elements of the smart card purchase log transaction information for an embodiment of the present invention;

FIG. 10 is a flow chart which illustrates the flow of information in the process of automatically updating the smart card loyalty register on the merchant terminal for an embodiment of the present invention.

DETAILED DESCRIPTION

Figure 1:
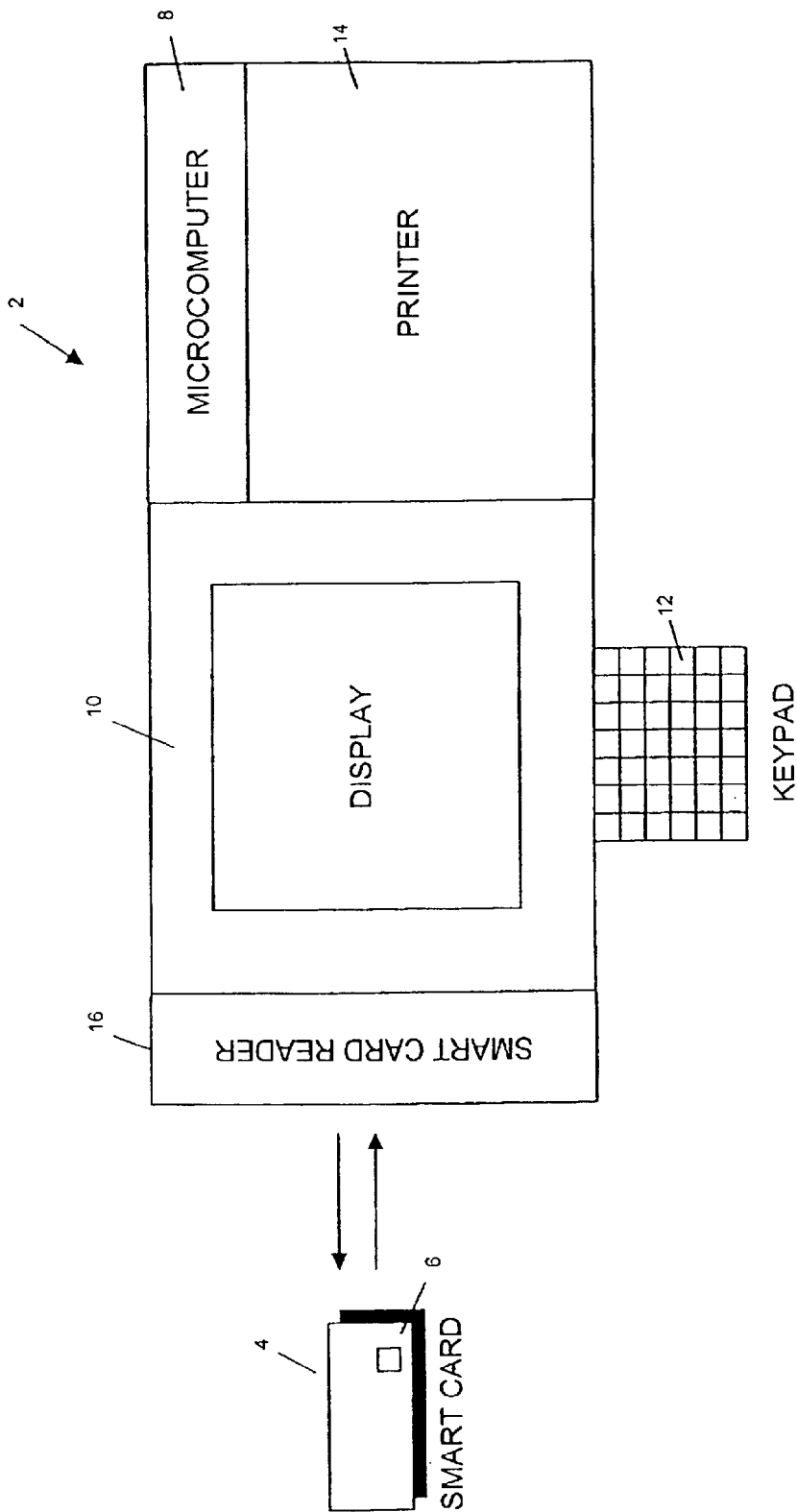
FIG. 1 shows schematically the key components for the stand alone terminal in an off-line smart card loyalty program for an embodiment of the present invention.

Referring now in detail to an embodiment of the present invention, an example of which is illustrated in the accompanying drawings, FIG. 1 shows schematically the key components of a stand alone terminal 2 used in an off-line smart card loyalty program for an embodiment of the present invention. Referring to FIG. 1, an embodiment of the off-line loyalty program of the present invention integrates a smart card 4 imbedded with a microcomputer 6 and the stand alone terminal 2 for tracking and redeeming merchant loyalty points. The smart card 4 consists of a credit card-sized plastic card embedded with microcomputer 6 having memory to set up and securely store at least one merchant loyalty register. The stand alone terminal 2 includes a microcomputer 8, a display 10, an input means such as keypad 12, a printer 14, and a smart card reader 16. The display 10 uses a device such as an LCD screen to display information. Further, the stand alone terminal 2 is interactive, such that a consumer can enter information or make choices using an alphanumeric keypad 12. Alternatively, the keypad 12 is, for example, menu-driven or a virtual keypad, such as a touch-screen.

Figure 2:
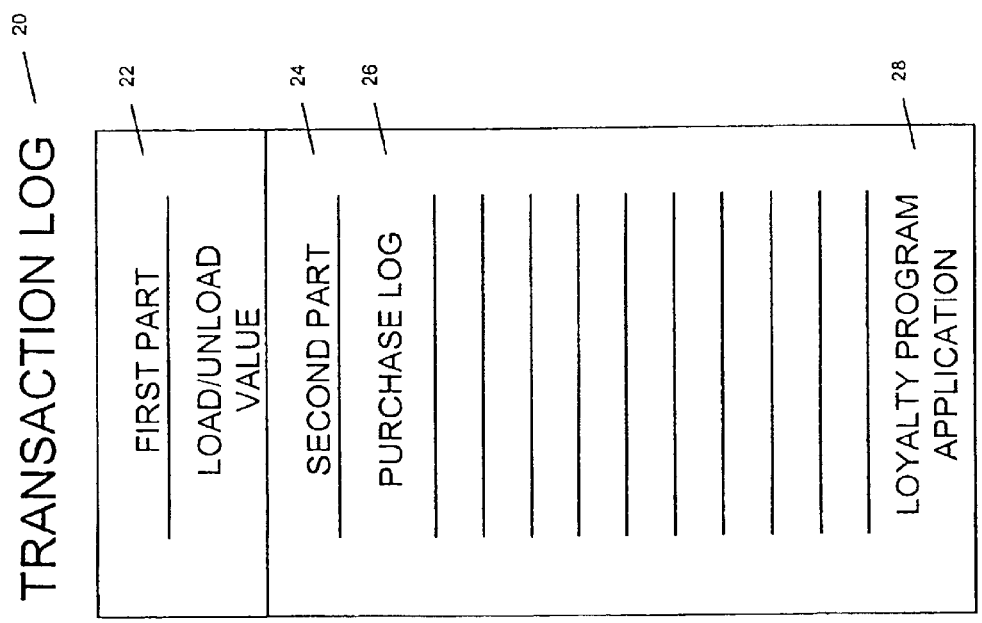
FIG. 2 is a table which illustrates the key elements of the smart card transaction log for an embodiment of the present invention.

In an embodiment of the present invention, smart card 4, such as a VISA Cash Smart Card, has a transaction log and a purse value stored within the memory of the card. FIG. 2 is a table which illustrates the key elements of the smart card transaction log for an embodiment of the present invention. Referring to FIG. 2, the transaction log 20 has two parts The first part 22 is used for loading and unloading value from the card 4, for example, at a merchant terminal. The second part 24 is the actual purchase log 26, which stores, for example, ten entries, as well as a loyalty program application 28. FIG. 3 is a table which illustrates the key elements of the smart card purchase log transaction information for an embodiment of the present invention. Referring to FIG. 3, the transaction log 20 creates a unique transaction number 30 for every transaction in ascending order. Other transaction information, such as the merchant identification number 32, the date of the transaction 34, and the amount of the transaction 36, is also associated with the transaction number 30 in the purchase log 26.

In an embodiment of the present invention, the stand alone terminal 2 activates the smart card loyalty capability on first usage or by other terminal initialization means by establishing a selected loyalty application 28 on microcomputer 6 of card 4. The terminal 2 can then display the current point balance, for example, on LCD screen 10, update a loyalty register of the loyalty program 28 and redeem loyalty points. The smart loyalty card system in an embodiment of the present invention is controlled by a local merchant without interaction with existing loyalty systems. Thus, frequent buyer-type loyalty programs can be easily established without the necessity, complexity and cost of integration with existing systems.

Figure 4:
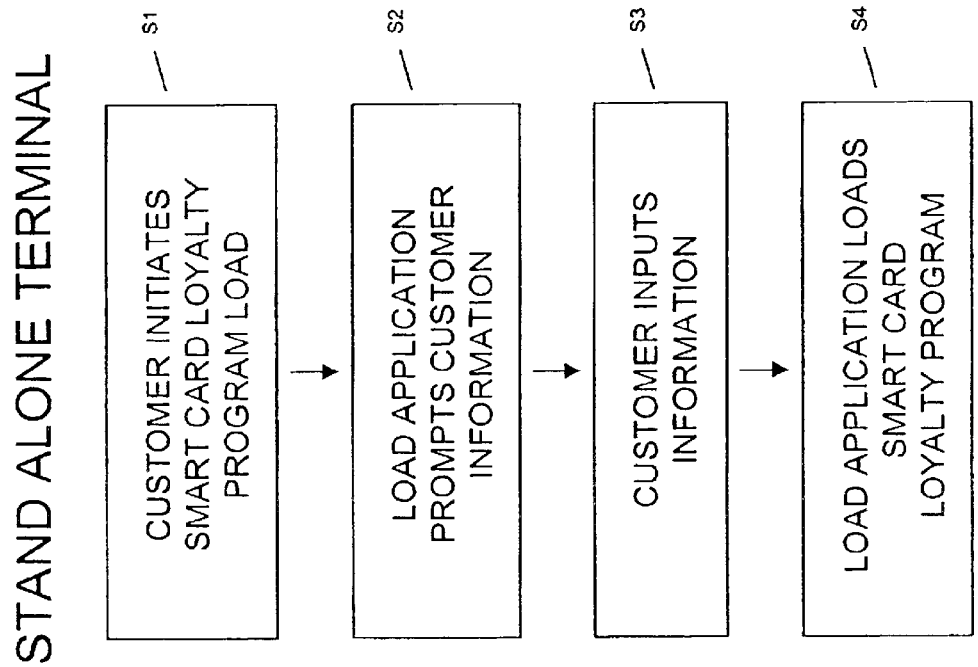
FIG. 4 is a flow chart which illustrates the flow of information between key components in the process of initiating the smart card loyalty program on a stand alone terminal for an embodiment of the present invention.

In an embodiment of the present invention, the smart card loyalty program 28 is initiated by inserting smart card 4 into the stand alone terminal 2. Alternatively, the loyalty program 28 is loaded onto card 4 by the issuer or through other means, such as a home computer, a public access terminal, such as an automated teller machine (ATM), or the Internet. The smart card 4 can be jointly issued by a bank and a local merchant, or it can be a stand alone cash card capable of being updated with a loyalty program. FIG. 4 is a flow chart which illustrates the flow of information in the process of initiating the smart card loyalty program on stand alone terminal 2 for an embodiment of the present invention. Upon insertion of the smart card 4, at S1, the stand alone terminal 2 prompts the consumer for specific customer information to initiate loading the loyalty program at S2. At S3, the customer inputs the customer information, which includes for example, demographic and biometric information for marketing and security purposes, respectively. Also, demographic information such as name, address, phone number, birth date, social security number, and other similar information, can be entered at S3. Further, information for security purposes, such as a personal identification number (PIN) and biometric information, such as fingerprints or eye scans, can be entered at S3. At S4, the terminal 2 loads one or more merchant loyalty registers within an area of the memory of the smart card 4.

Figure 5:
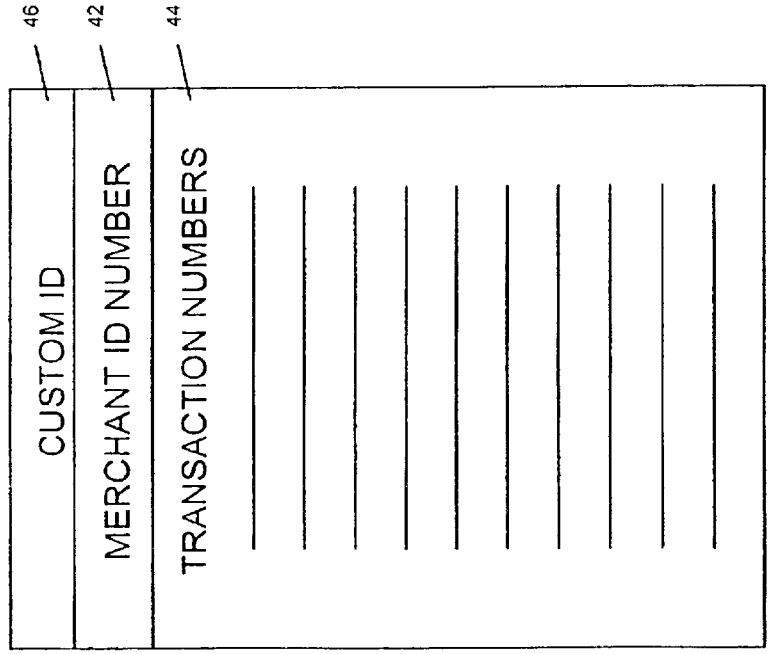
FIG. 5 is a table which illustrates the key elements of the smart card merchant loyalty register for an embodiment of the present invention.

FIG. 5 is a table which illustrates the key elements of the smart card loyalty program merchant loyalty register for an embodiment of the present invention. Referring to FIG. 5, in an embodiment of the present invention, each merchant loyalty register 40 is identified, such as by a merchant number 42, to allow transactions with that particular merchant to be matched with the loyalty register 40 for the particular merchant. Also, an identification of each installed loyalty program 28 can be placed on the outside of the card 4. The identification can be printed on the card 4, for example by using a dye sublimation process, or the program can be identified by placing a sticker on the card. Additionally, upon loading the loyalty register 40 or upon future use of the smart card 4 in the stand alone terminal 2, other incentive programs can be installed on the smart card associated with each merchant. For example, along with the loyalty register 40 a lotto-type number can be inserted. Each time a consumer uses the smart card 4 for a purchase, the lotto-type number is read and compared with a winning number that qualifies the consumer for a bonus, such as extra loyalty points or free or reduced price merchandise. Thus, extra incentive programs are advantageously built-in to the loyalty program.

Figure 6:
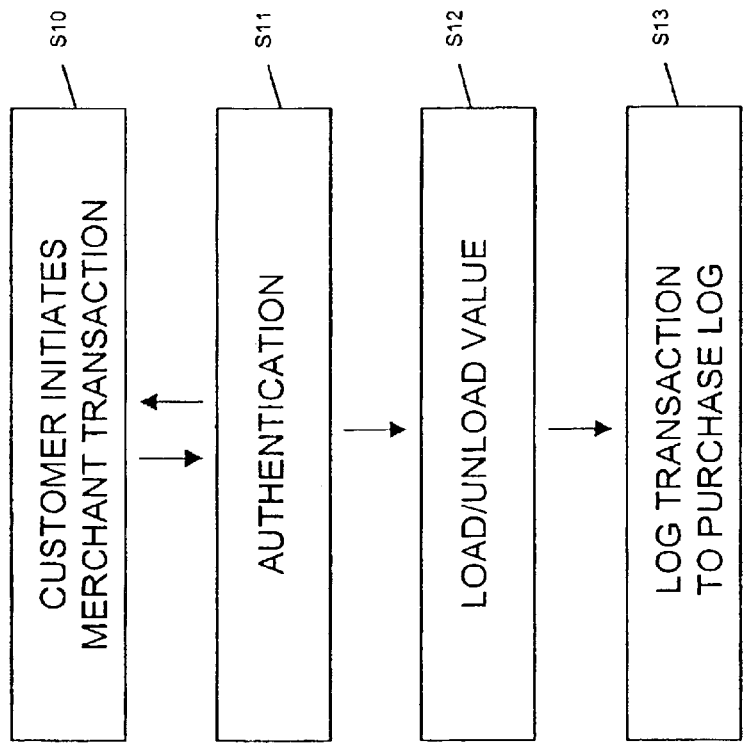
FIG. 6 is a flow chart with illustrates the flow of information between key components in the process of making a purchase with the smart card in a merchant terminal for an embodiment of the present invention.

In an embodiment of the present invention, once the merchant loyalty program is set up, the smart card 4 is used to track loyalty points. FIG. 6 is a flow chart with illustrates the flow of information in the process of making a purchase with the smart card 4 in a merchant terminal for an embodiment of the present invention. At S10, the consumer makes a purchase with the smart card 4 by inserting the smart card into a merchant terminal. A negotiation takes place between the smart card 4 and the merchant terminal, and the merchant terminal authenticates that the card 4 can be used for the particular consumer transaction at S11. The merchant terminal then loads or unloads value from the card 4, at S12, and writes information about the transaction to the purchase log 24 within the memory of the smart card 4 at S13.

Figure 7:
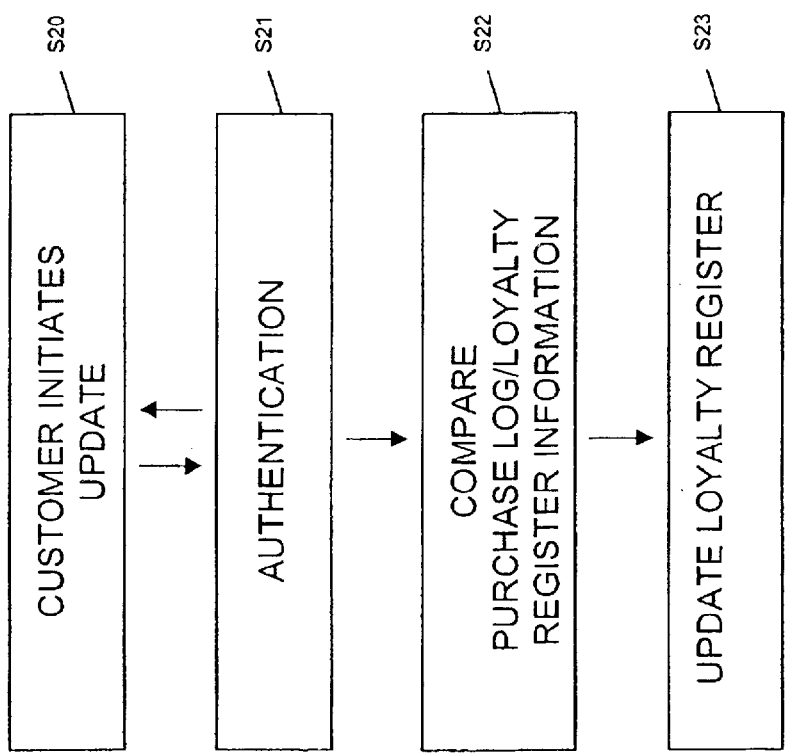
FIG. 7 is a flow chart which illustrates the flow of information between key components in the process of updating the smart card loyalty register on the stand alone terminal for an embodiment of the present invention.

FIG. 7 is a flow chart which illustrates the flow of information in the process of updating the smart card loyalty register 40 on the stand alone terminal 2 for an embodiment of the present invention. Referring to FIG. 7, in an embodiment of the present invention, after completing the merchant transaction at the merchant terminal, the consumer inserts the smart card 4 into the stand alone terminal 2 at S20. After authentication at S21, the stand alone terminal 2 compares information in the purchase log 24, such as the merchant identification number 32 and transaction number 30, to information in the loyalty register 40, such as the merchant identification number 42 associated with the particular merchant at S22. At S23, the stand alone terminal 2 adjusts the merchant loyalty register 40 to account for any unrecorded merchant transactions. Loyalty points for merchants within the register 40 are thus tracked and accumulated.

In an embodiment of the present invention, the information on the purchase log 24 is utilized upon insertion of card 4 into the stand alone terminal 2. As illustrated in FIG. 7, at S22, the information in the purchase log 26, shown in FIG. 3, is compared with the information in the merchant loyalty register 40, shown in FIG. 5. The merchant identification 32 associated with the transaction number 30 is compared to the merchant identification 42 of the loyalty register 40. If a match is found, the other information on the purchase log 24 is compared to information already in the merchant loyalty register 40. For example, smart card purchases made at the store of a particular merchant or at an associated chain of stores is credited only to the loyalty register 40 for the particular merchant. The merchant loyalty register 40 is updated at S23, as illustrated in FIG. 7, only if a transaction number 30 associated with that merchant is found in the purchase log 24 that is greater than any transaction number 44 in the merchant loyalty register 40. This insures that each transaction is recorded only once in the merchant loyalty register 40.

In an embodiment of the present invention, an alternative method for comparing and updating information in the merchant loyalty register 40 to the purchase log 24 is by comparing all transaction numbers 44 in merchant loyalty register 40 to all transaction numbers 30 in purchase log 24. In this manner, all transactions in the purchase log 24 are analyzed for potentially updating each merchant loyalty register 40 set up on the smart card 4. Thus, each merchant loyalty register 40 is updated with transactions that were previously unaccounted for from the purchase log 24.

In an embodiment of the present invention, since the merchant loyalty register 40 has value, the preferred embodiment of the present invention provides a security access to the merchant loyalty register 40 for writing purposes. Similar to a merchant transaction, writing to merchant loyalty register 40 requires negotiation between the smart card 4 and the stand alone terminal 2 that authenticates each side to the other at S21, as illustrated in FIG. 7, so that stand alone terminal 2 can securely write a value into the merchant loyalty register 40. This value may be the straight dollar value of the purchase or it may be modified by some algorithm, either up or down, to determine a value for loyalty points. On the other hand, there is an open read to the card 4 for reading the balance in a particular merchant loyalty register 40.

Figure 8:
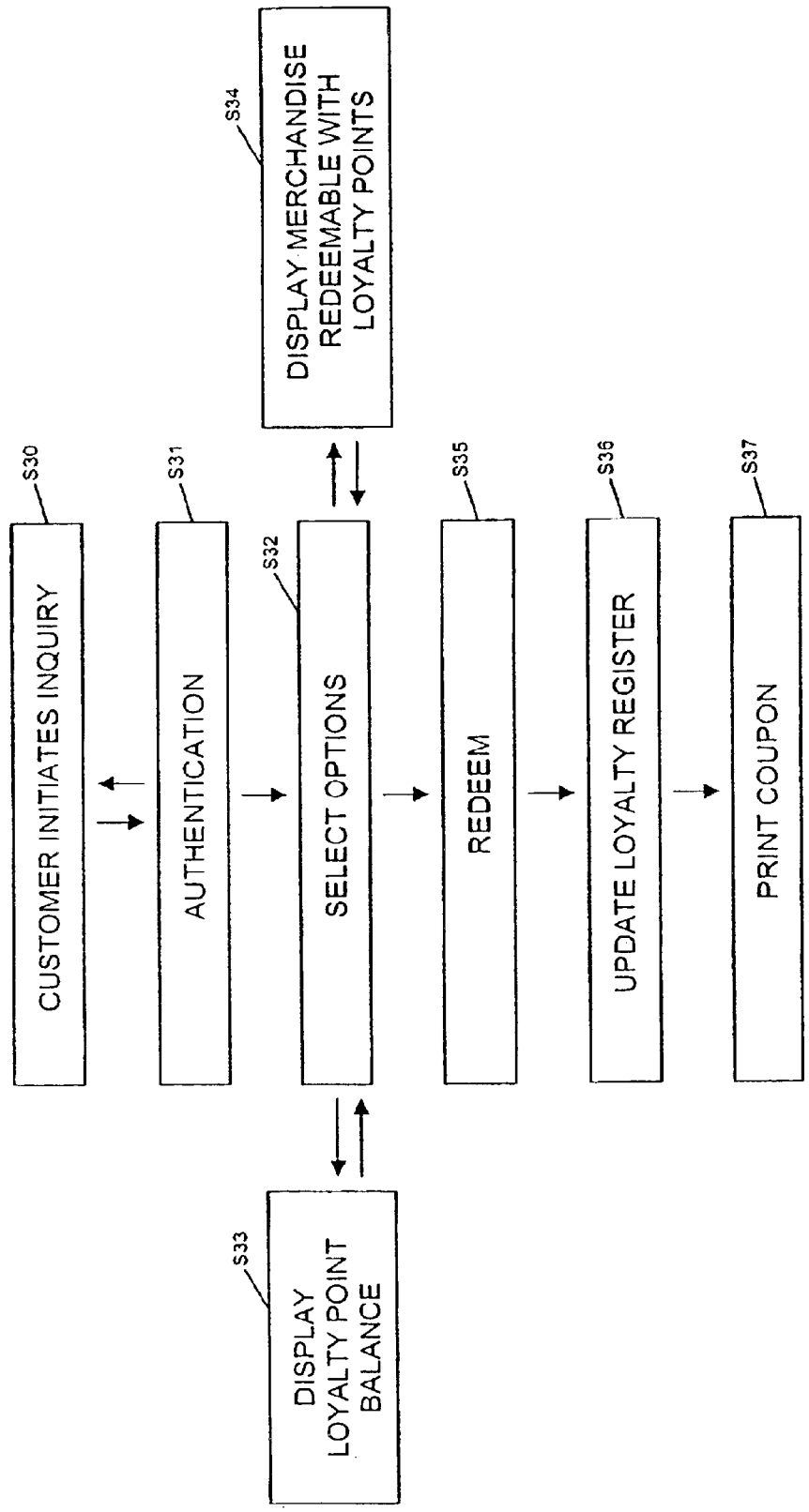
FIG. 8 is a flow chart which illustrates the flow of information between key components in the process of a customer inquiry regarding smart card loyalty points balance and redemption of smart card loyalty points for an embodiment of the present invention.

In an embodiment of the present invention, in addition to updating one or more merchant loyalty registers, the stand alone terminal 2 can be utilized to inquire about a particular merchant loyalty register or to redeem loyalty points. FIG. 8 is a flow chart which illustrates the flow of information in the process of a customer inquiry regarding smart card loyalty points balance and redemption of loyalty points for an embodiment of the present invention. Referring to FIG. 8, at S30, the smart card 4 is inserted into the stand alone terminal 2, which authenticates the card at S31. The consumer then chooses an option at S32 to display the balance for a specific loyalty register at S33. The consumer can choose additional options at S32 that show the number of loyalty points required to obtain specific merchant products or merchant credit at S34. The consumer can also choose to exchange loyalty points for the particular products or credits at S35. The stand alone terminal 2 then updates the specific merchant loyalty register to account for the exchange at S36 and prints out a coupon for use by the consumer at S37. The coupons can be standardized, for example, to match the current coupon program of the merchant, such as by printing out a UPC Code on the coupon. Also, the merchant can use the stand alone terminal 2 to enter a code, which can be changed frequently, to be printed on the coupon for security purposes.

Figure 9:
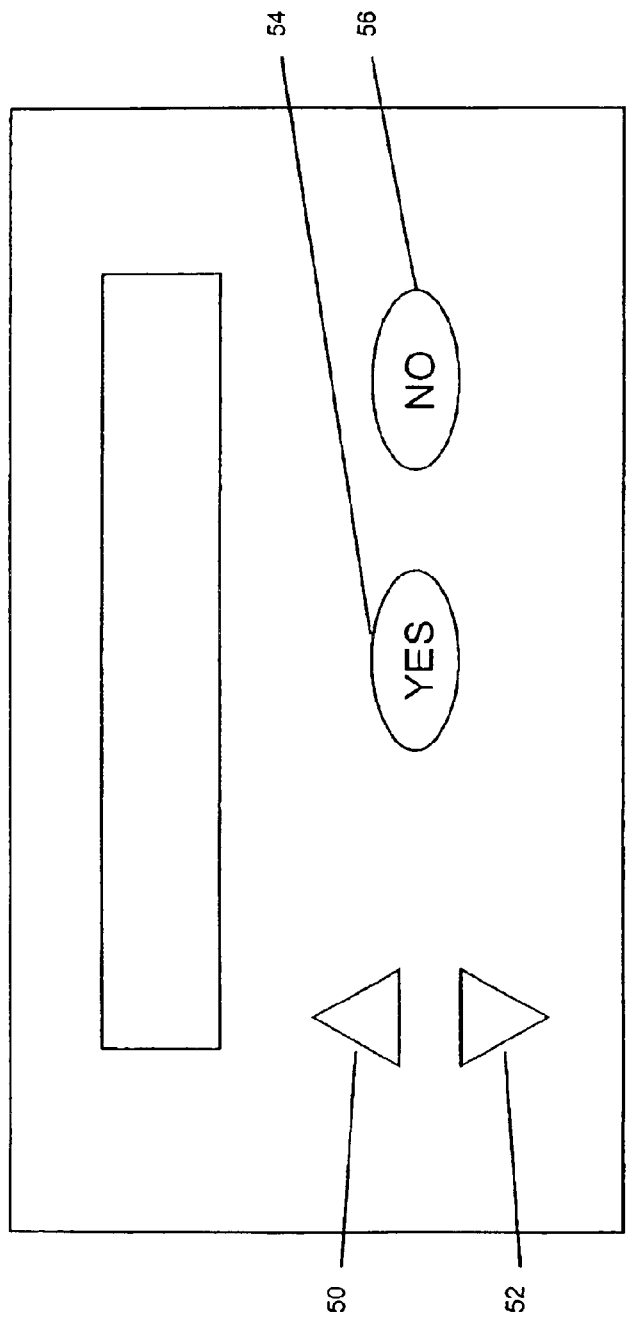
FIG. 9 is a somewhat schematic illustration depicting a menu-type keypad associated with the stand alone terminal for an embodiment of the present invention.

In an embodiment of the present invention, as an alternative, the stand alone terminal 2 can have only a menu-type selection capability, rather than data entry capability. FIG. 9 is a somewhat schematic illustration depicting a menu-type selection keypad for the stand alone terminal 2 for an embodiment of the present invention. Referring to FIG. 9, the stand alone terminal 2 can be provided, for example, with up/down keys 50, 52 and yes/no keys 54,56, such as on a commercially available terminal made by VERIFONE. In this alternative, the display 10 on the terminal 2 can show the balance of the loyalty register 40 and the redemption choices. The consumer then selects choices by using the up/down keys 50, 52 and the yes/no keys 54, 56.

In an embodiment of the present invention, as another alternative, the stand alone terminal 2 has the capability to print out summary information for the local merchant on printer 14. The merchant can print out daily/weekly/monthly reports on the loyalty program usage and other program information. These reports are useful in auditing total points given to customers, total points redeemed, and other similar information. As an additional alternative, the loyalty program 28 reports the update of the loyalty register 40 back to the stand alone terminal 2, and the stand alone terminal uploads the update to a back office loyalty server.

An embodiment of the present invention using the transaction file 20 that is on the card 4 has the limitation that it cannot be changed from the outside. Consequently, it is necessary for the transaction performed to be listed in the transactions file 20 on the card 4. The form of the transaction information includes the merchant identifier 32, the value of the transaction 36, and the transaction number 30, which is one of the key features. The card 4, such as a VISA Cash card, is set up so it can perform, for example, 32,000 transactions, which is the limit of the transaction register 20. That particular feature is unique, for example, to the VISA Cash card, so if the loyalty program is tied to the particular transaction value 36, transaction number 30, and merchant identifier 32, the loyalty program is limited to what is inside card 4, such as the VISA Cash card.

In an embodiment of the present invention, an associate loyalty program also runs in the card 4, which has its own corresponding registers 40, so it is possible to have multiple merchants. The card 4 can be inserted into a terminal, such as stand alone terminal 2, and the terminal looks at the transaction record 26. The terminal 2 also looks at the loyalty registers 40 to see if there is a match for the individual merchant or a chain of merchants to find a corresponding merchant, and compares the transaction numbers 30 that are in the transaction record 26 with the transaction numbers 44 that are in the loyalty register 40 for that merchant. If a transaction number 30 in the transaction record 26 is higher than any transaction number 44 in the merchant loyalty register 40, then it is confirmed that a new transaction has been performed, and loyalty points are updated. If the numbers are the same, then it is confirmed that there is no new transaction, and loyalty points are not updated.

In an embodiment of the present invention, in order for such a loyalty program to comply with pre-existing card rules, such as VISA Cash card rules, it is necessary to use an external terminal, such as stand alone terminal 2, to separately access the VISA Cash card transaction record 26 and the loyalty records 40, essentially in order to perform the comparison on the outside and update to the card 4. In such a process, since the loyalty update is operating outside the card 4, it is necessary to have a security mechanism, including a special key, called a loyalty key, that resides in terminal 2, for authentication at S21 as shown in FIG. 7. The loyalty key residing in the terminal 2 allows secure update of the loyalty register 40. Without such a loyalty key in terminal 2, anyone could put the card 4 into the terminal, or into a simulation of the terminal, and arbitrarily add loyalty points to the card.

In an alternate embodiment of the present invention, as an alternative to loyalty updates at stand alone terminal 2, loyalty updates are performed as a function of card 4 itself. In other words, the update is done internally, rather than at stand alone terminal 2, and can be done automatically or triggered, for example, by the merchant terminal. The merchant terminal can also request a response from the card 4 with the result of the action, so the merchant terminal can print out the action, or the data can be used for a central system. The merchant terminal, either on-line or periodically, reports the data back to the central system. In such case, the need for stand alone terminal 2 is eliminated, which is more secure, because performing the loyalty update on the card 4 instead of on an external stand alone terminal 2 eliminates the possibility of a third party intercepting transmission of the transaction to and from the card 4 and therefore eliminates an opportunity for the third party to tamper with the transmission.

FIG. 10 is a flow chart which illustrates the flow of information in the process of automatically updating the smart card loyalty register on a terminal, such as the merchant terminal, for an alternate embodiment of the present invention. Thus, when a purchase or a load transaction is performed at the merchant terminal, as illustrated at S10 through S13 in FIG. 6, another application, or loyalty application, on the card 4 automatically reads information in the transaction log 26 off the card at S40, as shown in FIG. 10, automatically reads information in the loyalty register 40 off the card 4 at S41, and automatically compares the transaction log information to the loyalty register information at S42. If, for example, the transaction number 30 in the transaction log 26 is greater than the transaction number 44 in the loyalty register 40, the loyalty application on card 4 automatically updates the loyalty register 40 for each transaction at S43.

In an alternate embodiment of the present invention, modified card rules, for example, modified VISA Cash card rules, allow the other application on the card 4 to access internally the card transaction log 26 on a read only basis, which allows the loyalty update to be performed more securely. Under such modified rules, the loyalty application is written that resides on the card 4 with multiple merchants, that has an automatic mode, so that at the end of every card transaction, the card 4 does a scan internally and looks at the transaction record 26 and then scans the loyalty registers 40 for a matching merchant identifier 42. If there is a match and a new transaction is identified by the transaction counter, a loyalty update occurs. This process can be done all automatically, or the terminal can initiate the process with a message, for example, to "perform loyalty update and return results." The process is a very simple operation in which the terminal does not participate other than to receive the command and allow the loyalty transaction update to be returned to the terminal and optionally to be printed on a receipt. Such a system can be part of a back office system that must be kept up to date, in which case the loyalty update is captured by the terminal and forwarded at a later time to a central location.

In an embodiment of the present invention, whether the user uses a VISA Cash card, or a credit card, or any other kind of card, as long as there is a transaction, at least the last transaction, for example, a credit transaction or a debit transaction, performed by the card 4, there is a register that always keeps track of the last transaction done by the card. The card 4 stores that last transaction, or it can store multiple transactions, but an embodiment of the present invention works to provide a loyalty program for any credit card. Regardless of where the consumer shops with the consumer's credit card, the loyalty program also applies, because the consumer can do it either with the off-line stand alone terminal 2 or with another application, or loyalty application, on the card 4. The same mechanism is used whether it is a credit or a debit or a specialty card utilizing the same concept of the stored value card, such as a VISA Cash card or any other transaction card.

In an alternate embodiment of the present invention, a merchant or home PC terminal completion and/or authorization of a financial transaction with an on-line host causes the automatic calculation of loyalty points, at the host, to be down-line loaded during the same financial transaction to the smart card. The loyalty program, in this case, is real time driven and/or controlled from the host end to maintain database and smart card synchronism. Other embodiments are driven and/or controlled from the terminal and/or smart card end that provide for real time or batch delayed database and smart card synchronism. The real time, on-line approach provides for more sophisticated dynamic loyalty programs without having to update programming in terminals and cards.

In an embodiment of the present invention, redemption of the loyalty points requires a type of security module similar to a normal purchase transaction in which there is a purchase key essentially in the card 4 that is associated with the loyalty program and also in a terminal device, so that the card can be securely decremented. A mechanism for security in generating the loyalty points utilizes a generic command in the terminal to do the loyalty point award, or alternatively, a program on the card automatically awards the loyalty points after each transaction.

In an embodiment of the present invention, a merchant may wish, for example, to run specials such as on a particular day of the week to award the consumer double points if the consumer uses the card 4 at a certain time of day, such as between 2:00 pm and 4:00 pm. In order to accomplish that, since the terminal records the merchant identifier 42, for example, a couple of bytes of the merchant identifier is used to specify specific kinds of updates. For example, either a central system or the merchant loads into the terminal, remotely or locally, the variation of the two bytes into the merchant's identifier 42. Thus, when the terminal operates and commands "do loyalty update," or when the transaction takes place and the transaction is stored in the transaction record 26 of the card 4, when the loyalty application on the card looks at the merchant identifier 42 and compares the merchant identifier, it uses that information to adjust how the points are added to the card, either one to one, or with some multiplier, or with some other variation to award loyalty points.

In an embodiment of the present invention, the program may operate at the single merchant level, or at individual merchants who are part of a merchant chain. To enhance the marketability of the program and as a visual aid, the single merchant loyalty program uses pre-printed cards with space on the card 4 for printing a merchant logo and the issuer's logo, such as a bank or other financial institution logo. Further, the printing on the card 4 can also include all of the pertinent data needed for using the card, such as a customer service number or even a photo. The card 4 can also include an unprinted area that may be personalized by either the card holder or the merchant. For example, the merchant can print additional source identification, besides the logo. The post-issuance printing on the card 4 can be accomplished with standard printing technologies, such as dye sublimation. The post-issuance printing is relatively low cost and enables a neighborhood merchant to participate in a loyalty program.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method of tracking smart card merchant loyalty program information for a customer, comprising:
    storing loyalty program information in a loyalty register of a loyalty program application on a purchase log part of a transaction log on a smart card microcomputer, wherein the loyalty program application is capable of storing loyalty program information for a plurality of merchants, each identified by a unique merchant identifier, in a plurality of loyalty registers and wherein the loyalty program information includes information related to transactions with at least one merchant for the customer and the loyalty register is identified by the unique merchant identifier the customer and the loyalty register is identified by the unique merchant identifier associated with the merchant to enable transactions with the merchant to be matched with the loyalty register for the merchant;
    storing transaction information on the purchase log part of the transaction log on the smart card microcomputer about transactions with the merchant for the customer at a merchant terminal, wherein the transaction information includes the unique merchant identifier and a unique transaction number associated with each transaction with the merchant in ascending numerical order;
    comparing the stored transaction information with the stored loyalty program information at a stand-alone terminal that is independent of the merchant terminal;
    automatically identifying transaction information stored on the purchase log part of the transaction log at the stand-alone terminal about at least one transaction with the merchant for which an associated transaction number is numerically greater than any transaction number for a transaction with the merchant stored in the stored loyalty program information; and
    automatically adding the identified transaction information to the stored loyalty program information at the stand-alone terminal.

2. The method of claim 1, wherein storing loyalty program information further comprises loading a loyalty program application into programmable memory on the smart card microcomputer at a terminal.

3. The method of claim 2, wherein loading the loyalty program application further comprises inputting customer information to the loyalty program application on the terminal.

4. The method of claim 3, wherein the terminal comprises the merchant terminal.

5. The method of claim 3, wherein the terminal comprises a stand alone terminal.

6. The method of claim 1, wherein storing the loyalty program information further comprises storing the information in the loyalty register of the loyalty program application loaded into programmable memory on the smart card microcomputer.

7. The method of claim 1, wherein the merchant identifier comprises a merchant identification number associated with the merchant.

8. The method of claim 1, wherein storing transaction information further comprises performing a merchant transaction for the customer with the smart card at the merchant terminal.

9. The method of claim 8, wherein performing the merchant transaction further comprises transferring information representing monetary value between a stored value application on the smart card microcomputer and a terminal application for the customer.

10. The method of claim 9, wherein transferring the information further comprises automatically logging the transfer for the customer to the purchase log on the smart card microcomputer.

11. The method of claim 1, wherein the transaction information further comprises a transaction amount and a transaction date for the merchant transaction.

12. The method of claim 1, wherein comparing further comprises automatically comparing by an application on the smart card microcomputer of the transaction information stored in the purchase log on the smart card microcomputer with the loyalty program information stored in a loyalty register on the smart card microcomputer.

13. The method of claim 1, wherein comparing further comprises automatically comparing transaction information stored in a purchase log on the smart card microcomputer with loyalty program information stored in a loyalty register on the smart card microcomputer at a terminal.

14. The method of claim 13, wherein the terminal comprises a merchant terminal.

15. The method of claim 13, wherein the terminal comprises a stand alone terminal.

16. The method of claim 1, wherein automatically identifying further comprises automatically identifying by an application on the smart card microcomputer of the transaction number associated with the transaction information for which a corresponding merchant identifier is stored in the loyalty program information.

17. The method of claim 1, wherein automatically identifying further comprises automatically identifying transaction number associated with the transaction information for which a corresponding merchant identifier is stored in the loyalty program information.

18. The method of claim 17, wherein the merchant identifier further comprises a merchant identification number associated with the merchant.

19. The method of claim 1, wherein automatically updating further comprises storing the identified transaction information with the stored loyalty program information for the customer by an application on the smart card microcomputer.

20. The method of claim 1, wherein automatically updating further comprises storing the identified transaction information with the stored loyalty program information for the customer.

21. The method of claim 20, wherein the identified transaction information comprises a unique transaction number associated with the merchant transaction.

22. The method of claim 21, wherein the identified transaction information further comprises a merchant identification number associated with the merchant.

23. The method of claim 22, wherein storing the identified transaction information further comprises storing the identified transaction information in the loyalty register on the smart card microcomputer for the customer at the stand-alone terminal.

24. The method of claim 23, further comprising automatically printing a summary report of the loyalty program information for the merchant on a printer associated with the stand-alone terminal.

25. The method of claim 23, further comprising automatically uploading the loyalty program information by the stand-alone terminal to a back office loyalty server.

26. The method of claim 1, wherein storing the transaction information further comprises storing a plurality of the unique transaction numbers in ascending order, each of which transaction numbers is associated with one of a plurality of merchant transactions for the customer.

27. The method of claim 26, wherein the stored loyalty program information comprises at least one of the unique transaction numbers.

28. The method of claim 1, wherein the stored loyalty program information comprises information representing a balance of accumulated loyalty points stored in the loyalty program register on the smart card microcomputer.

29. The method of claim 28, further comprising accessing the balance information on the smart card loyalty register by the customer at a terminal.

30. The method of claim 29, wherein the terminal comprises a merchant terminal.

31. The method of claim 29, wherein the terminal comprises a stand alone terminal.

32. The method of claim 29, wherein accessing the balance information further comprises displaying the balance information for the customer on a display screen associated with the terminal.

33. The method of claim 32, further comprising displaying information about redeeming at least some of the accumulated loyalty points for the customer on the display screen.

34. The method of claim 33, further comprising entering a request for the customer for redemption of least some of the accumulated loyalty points on an input device associated with the terminal.

35. The method of claim 34 further comprising automatically updating the balance information for the customer with information about the redemption of the loyalty points.

36. The method of claim 35, further comprising automatically printing a redemption coupon for the customer representing a redemption value of the redeemed loyalty points on a printer associated with the terminal.

37. A system of tracking smart card merchant loyalty program information for a customer, comprising:
   a loyalty register of a loyalty program application on a purchase log part of a smart card transaction log for storing loyalty program information on a smart card microcomputer, wherein the loyalty program, application is capable of storing loyalty program information for a plurality of merchants, each identified by a unique merchant identifier, in a plurality of loyalty registers and wherein the loyalty program information includes information related to transactions with at least one merchant for the customer and the loyalty register is identified by the unique merchant identifier associated with the merchant to enable transactions with the merchant to be matched with the loyalty register for the merchant;
   means for storing transaction information on the purchase log part of the transaction log on the smart card microcomputer about transactions with the merchant for the customer at a merchant terminal, wherein the transaction information includes the unique merchant identifier and a unique transaction number associated with each transaction with the merchant in ascending numerical order;
   means associated with the transaction information storing means and the loyalty register for comparing the stored transaction information with the stored loyalty program information at a stand-alone terminal that is independent of the merchant terminal;
   means associated with the comparing means for automatically identifying transaction information stored on the purchase log part of the transaction log at the stand-alone terminal about at least one transaction with the merchant for which an associated transaction number is numerically greater than any transaction number for a transaction with the merchant stored with the stored loyalty program information;
   means associated with the identifying means and the loyalty for automatically adding the identified transaction information to the stored loyalty program information at the stand-alone terminal.

38. The system of claim 37, wherein the transaction storing means further comprises a merchant application communicating with the transaction log at the merchant terminal.

39. The system of claim 37, wherein the comparing means comprises an application on the smart card microcomputer.

40. The system of claim 37, wherein the means for adding the identified transaction information to the stored loyalty program information comprises an application on the smart card microcomputer.

41. A method of tracking smart card merchant loyalty program information for a customer, comprising:
   storing loyalty program information in a loyalty register of a loyalty program application on a purchase log part of a transaction log in programmable memory on a smart card microcomputer, wherein the loyalty program application is capable of storing loyalty program information for a plurality of merchants, each identified by a unique merchant identifier, in a plurality of loyalty registers and wherein the loyalty program information includes information related to transactions with at least one merchant for the customer and the loyalty register is identified by the unique merchant identifier associated with the merchant to enable transactions with the merchant to be matched with the loyalty register for the merchant;
   storing transaction information on the purchase log part of the transaction log in programmable memory on the smart card microcomputer about transactions with the merchant for the customer at a merchant terminal, wherein the transaction information includes the unique merchant identifier and a unique transaction number associated with each transaction with the merchant in ascending numerical order;
   comparing, by an application in programmable memory on the smart card microcomputer, the transaction information stored in the purchase log on the smart card microcomputer with the loyalty program information stored in the loyalty register on the smart card microcomputer at a stand-alone terminal that is independent of the merchant terminal;
   automatically identifying, by the application in programmable memory on the smart card microcomputer, a transaction number associated with the transaction information stored on the purchase log part of the transaction log at the stand-alone terminal for which a corresponding merchant identifier is stored in the loyalty program information about at least one transaction with the merchant for which an associated transaction number is numerically greater than any transaction number for a transaction with the merchant stored in the stored loyalty program information; and
   automatically adding the identified transaction information to the stored loyalty program information by an application in programmable memory on the smart card microcomputer at the stand-alone terminal.

42. A system of tracking smart card merchant loyalty program information for a customer, comprising:

a loyalty register of a loyalty program application on a purchase log part of a smart card transaction log in programmable memory on a smart card microcomputer for storing loyalty program information, wherein the loyalty program application is capable of storing loyalty program information for a plurality of merchants, each identified by a unique merchant identifier, in a plurality of loyalty registers and wherein the loyalty program information includes information related to transactions with at least one merchant for the customer and the loyalty register is identified by the unique merchant identifier associated with the merchant to enable transactions with the merchant to be matched with the loyalty register for the merchant;

wherein the purchase log part of the transaction log in programmable memory on the smart card microcomputer is adapted for storing transaction information about transactions with the merchant for the customer at a merchant terminal, wherein the transaction information includes the unique merchant identifier and a unique transaction number associated with each transaction with the merchant in ascending numerical order;

an application in programmable memory on the smart card microcomputer for comparing the transaction information stored in the purchase log in programmable memory on the smart card microcomputer with the loyalty program information stored in the loyalty register in programmable memory on the smart card microcomputer at a stand-alone terminal that is independent of the merchant terminal;

wherein, the application in programmable memory on the smart card microcomputer is adapted for automatically identifying a transaction number associated with the transaction information stored on the purchase log part of the transaction log at the stand-alone terminal for which a corresponding merchant identifier is stored in the loyal program information about at least one transaction with the merchant for which an associated transaction number is numerically greater than any transaction number for a transaction with the merchant stored with the stored loyalty program information; and wherein the application in programmable memory on the smart card microcomputer is also adapted for automatically adding the identified transaction information to the stored loyalty program information at the stand-alone terminal.

* * * * *

UNITED STATES PATENT AND TRADEMARK OFFICE
CERTIFICATE OF CORRECTION

PATENT NO.     : 6,889,198 B2
DATED          : May 3, 2005
INVENTOR(S)    : Joseph C. Kawan It is certified that error appears in the above-identified patent and that said Letters Patent is hereby corrected as shown below:

Column 11,
Lines 13 and 14, please change "unique merchant identifier the customer and the loyalty register is identified by the unique merchant identifier" to -- unique merchant identifier associated with the merchant to enable transactions --.

Column 13,
Line 10, please change "loyalty for automatically adding the identified transaction" to -- loyalty program information for automatically adding the identified transaction --.

Signed and Sealed this

Fifteenth Day of November, 2005

JON W. DUDAS
*Director of the United States Patent and Trademark Office*